United States Patent
Kapadia et al.

(10) Patent No.: US 9,537,793 B2
(45) Date of Patent: Jan. 3, 2017

(54) ENSURING ANY-TO-ANY REACHABILITY WITH OPPORTUNISTIC LAYER 3 FORWARDING IN MASSIVE SCALE DATA CENTER ENVIRONMENTS

(71) Applicant: Cisco Technology, Inc., San Jose, CA (US)

(72) Inventors: Shyam Kapadia, Santa Clara, CA (US); Nilesh Shah, Fremont, CA (US); Bhushan Kanekar, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 535 days.

(21) Appl. No.: 13/648,394

(22) Filed: Oct. 10, 2012

(65) Prior Publication Data

US 2014/0098823 A1    Apr. 10, 2014

(51) Int. Cl.
*H04L 12/56* (2006.01)
*H04L 12/933* (2013.01)
*H04L 12/775* (2013.01)
*H04L 12/947* (2013.01)
*H04L 12/747* (2013.01)
*H04L 12/741* (2013.01)

(52) U.S. Cl.
CPC .............. *H04L 49/10* (2013.01); *H04L 45/58* (2013.01); *H04L 49/25* (2013.01); *H04L 45/742* (2013.01); *H04L 45/745* (2013.01)

(58) Field of Classification Search
None
See application file for complete search history.

(56) References Cited

U.S. PATENT DOCUMENTS

| | | | |
|---|---|---|---|
| 5,991,299 A | 11/1999 | Radogna et al. | |
| 6,542,967 B1 * | 4/2003 | Major | G06F 12/127 707/E17.12 |
| 6,678,274 B1 * | 1/2004 | Walia | G06F 9/52 370/351 |
| 7,467,228 B2 * | 12/2008 | Roeder et al. | 709/240 |

(Continued)

OTHER PUBLICATIONS

International Search Report and Written Opinion in counterpart International Application No. PCT/US2013/062526, mailed Jan. 31, 2014, 10 pages.

*Primary Examiner* — Jeffrey M Rutkowski
*Assistant Examiner* — Jonathan B Wood
(74) *Attorney, Agent, or Firm* — Edell, Shapiro & Finnan, LLC

(57) ABSTRACT

Techniques are provided for updating routing tables of switch devices. At a first switch device of a first rack unit in a network, information is received about addresses of host devices in the network. The addresses are stored in a software cache. A packet is received from a first host device assigned to a first subnet and housed in the first rack unit. The packet is destined for a second host device assigned to a second subnet and housed in a second rack unit in the network. The packet is forwarded using the subnet entry and it may remain sub-optimal during a period before which an entry can be installed form a software cache. The software cache is evaluated to determine the address of the second host device. The packet is then forwarded optimally. This will ensure any-to-any communications in the network initially sub-optimally and subsequently optimally.

23 Claims, 4 Drawing Sheets

(56) References Cited

U.S. PATENT DOCUMENTS

| | | | | |
|---|---|---|---|---|
| 7,835,301 B1* | 11/2010 | Maufer | | H04W 24/02 |
| | | | | 370/254 |
| 8,019,902 B2* | 9/2011 | Kagan | | G06F 9/546 |
| | | | | 370/392 |
| 8,073,968 B1* | 12/2011 | Shah et al. | | 709/238 |
| 8,208,463 B2 | 6/2012 | Yadav et al. | | |
| 8,265,076 B2 | 9/2012 | Pignatelli | | |
| 8,577,989 B2* | 11/2013 | Broda | | H04L 67/2842 |
| | | | | 705/7.11 |
| 8,943,490 B1* | 1/2015 | Jain | | H04Q 3/54516 |
| | | | | 717/168 |
| 9,253,243 B2* | 2/2016 | Thompson | | H04L 67/02 |
| 2001/0053151 A1* | 12/2001 | Chikamatsu | | H04L 12/66 |
| | | | | 370/395.1 |
| 2002/0085554 A1 | 7/2002 | Park | | |
| 2002/0087659 A1* | 7/2002 | Chapman et al. | | 709/218 |
| 2002/0093973 A1* | 7/2002 | Tzeng | | H04L 12/5601 |
| | | | | 370/419 |
| 2002/0186679 A1* | 12/2002 | Nakatsugawa et al. | | 370/349 |
| 2003/0043816 A1 | 3/2003 | Mitchem et al. | | |
| 2004/0095943 A1* | 5/2004 | Korotin | | 370/401 |
| 2004/0170181 A1* | 9/2004 | Bogdon | | H04L 12/5692 |
| | | | | 370/400 |
| 2005/0013308 A1* | 1/2005 | Wybenga | | H04L 45/00 |
| | | | | 370/396 |
| 2005/0038907 A1 | 2/2005 | Roeder et al. | | |
| 2005/0111384 A1* | 5/2005 | Ishihara et al. | | 370/254 |
| 2005/0286531 A1* | 12/2005 | Tuohino | | H04L 29/1216 |
| | | | | 370/395.2 |
| 2009/0157684 A1* | 6/2009 | Andersen | | G06F 9/5083 |
| 2011/0134924 A1* | 6/2011 | Hewson | | H04L 12/4625 |
| | | | | 370/392 |
| 2011/0271007 A1* | 11/2011 | Wang et al. | | 709/238 |
| 2011/0310739 A1* | 12/2011 | Aybay | | 370/235 |
| 2012/0076006 A1* | 3/2012 | DeCusatis | | 370/250 |
| 2012/0155453 A1* | 6/2012 | Vohra et al. | | 370/352 |
| 2012/0155467 A1* | 6/2012 | Appenzeller | | 370/392 |
| 2013/0051232 A1* | 2/2013 | Gavrilov | | H04L 49/358 |
| | | | | 370/235 |
| 2013/0291117 A1* | 10/2013 | Thubert | | H04L 63/1458 |
| | | | | 726/26 |
| 2014/0086253 A1* | 3/2014 | Yong | | H04L 12/4633 |
| | | | | 370/395.53 |

* cited by examiner

ENSURING ANY-TO-ANY REACHABILITY WITH OPPORTUNISTIC LAYER 3 FORWARDING IN MASSIVE SCALE DATA CENTER ENVIRONMENTS

TECHNICAL FIELD

The present disclosure relates to optimizing data communications between servers in a network environment.

BACKGROUND

In data center environments, rack units may house many server devices that host physical and virtual host devices. These servers are connected to Top of Rack (ToR) switch devices that are, in turn, connected to other ToR switches via a spine-fabric. Packets of data communications between host devices in different rack units may be routed between corresponding ToR switch devices via the spine-fabric. In these data center environments, it is desirable for any host device to be able to communicate with any other host device in the data center, regardless of whether the host devices are located in different rack units. Such communications are called any-to-any communications. The ToR switches may be provisioned to send the data packets in the network along routing paths between host devices.

DESCRIPTION OF EXAMPLE EMBODIMENTS

Overview

Techniques are provided for updating routing tables of switch devices to enable optimal packet transmission within a network. These techniques may be embodied as a method, apparatus and instructions in a computer-readable storage media to perform the method. At a first switch device of a first rack unit in a network, information is received about one or more addresses associated with all host devices in the network. The addresses are stored in a cache at the first switch device. A packet is received from a first host device that is assigned to a first subnet and housed in the first rack unit. The packet is destined for a second host device that is assigned to a second subnet and housed in a second rack unit in the network. A copy of the packet is stored in the cache. The cache is then evaluated to determine the address of the second host device, and the information about the address of the second host device is written into a memory component of the first switch device.

Example Embodiments

Figure 1:
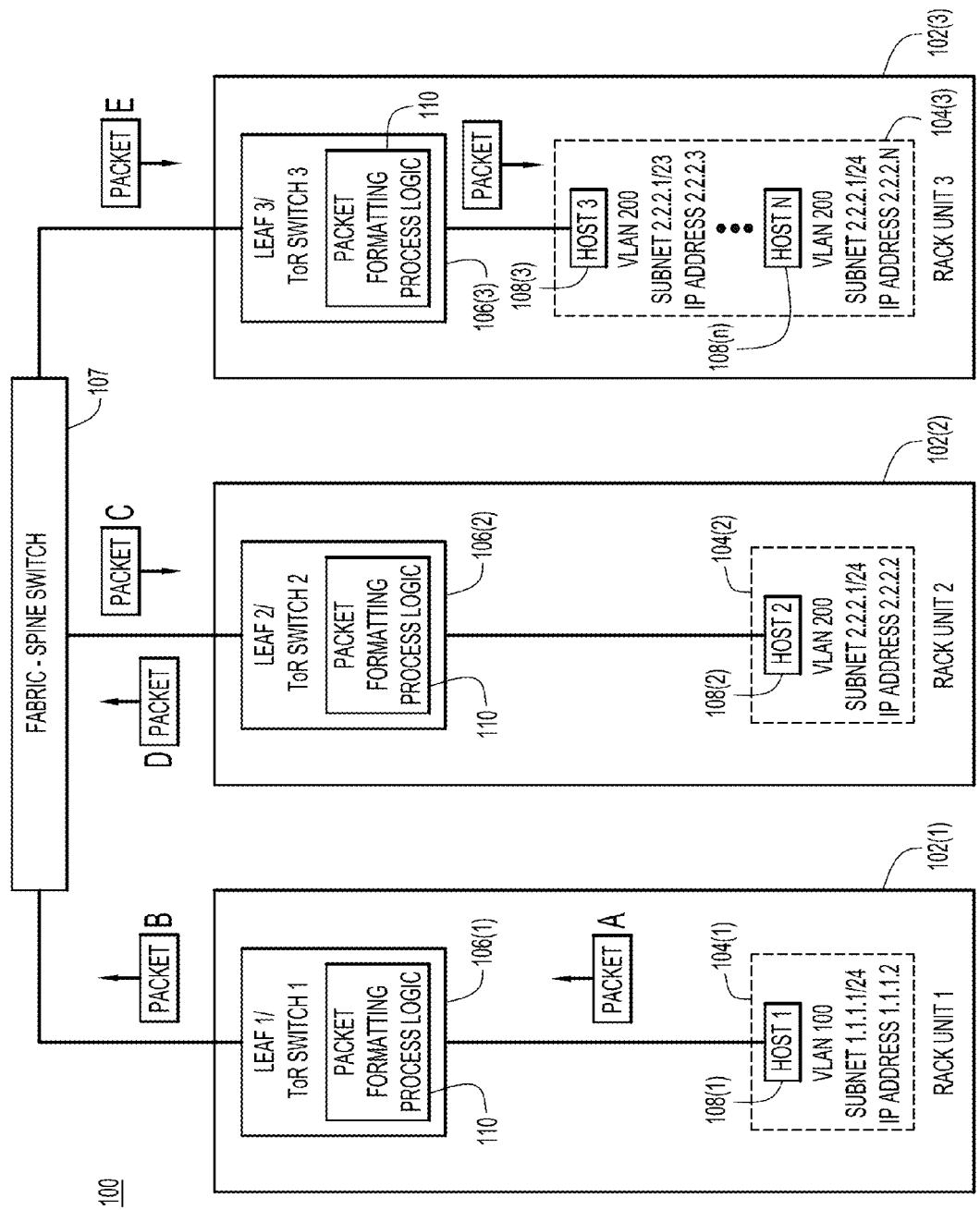
FIG. 1 shows an example network topology including a plurality of rack units, each of which houses one or more host devices and a switch device that optimally routes packets in the network.

The techniques described herein relate to optimizing data communications in a network. An example system/topology 100 is illustrated in FIG. 1. The topology 100 (hereinafter "network topology" or "network") has a plurality of rack units (or "racks"). The rack units are shown at reference numerals 102(1)-102(3). Rack unit 102(1) may be referred to hereinafter as "Rack Unit 1," rack unit 102(2) may be referred to hereinafter as "Rack Unit 2" and so on.

Each of the rack units 102(1)-102(3) is configured to host one or more physical servers units (hereinafter "servers"). The servers are shown at reference numerals 104(1)-104(3). Server 104(1) may be referred to hereinafter as "Server 1," server 104(2) may be referred to hereinafter as "Server 2" and so on. The servers 104(1)-104(3) may be arranged in one or more local area network (LANs). For example, all of the servers 104(1)-104(3) (or a subset of the servers) may be arranged in the same LAN, or the servers 104(1)-104(3) may each be arranged in a different LAN.

Each rack unit also has a switch device ("switch," "top of rack switch" or "ToR switch"), shown at reference numerals 106(1)-106(3). The switches 106(1)-106(3) are connected to a central switch device, which is shown at reference numeral 107. For example, the central switch device 107 may be a fabric switch device arranged in a "spine" network configuration, while the switches 106(1)-106(3) may be arranged in a "leaf" network configuration with respect to the central switch device 107. Switch 106(1) may be referred to hereinafter as "Leaf 1"/"ToR Switch 1," switch 106(2) may be referred to hereinafter as "Leaf 2"/"ToR Switch 2" and so on. The central switch device 107 may be referred to hereinafter as the "Fabric-Spine Switch." The switches 106(1)-106(3) are configured to forward communications (e.g., packets) from respective servers 104(1)-104(3) within a rack unit to appropriate destination devices and also to communicate with other switches residing in other rack units via the Fabric-Spine Switch 107. For example, ToR Switch 1 forwards communications to and from Server 1 in Rack Unit 1, ToR Switch 2 forwards communications to and from Server 2 in Rack Unit 2 and so on. In one example, the Fabric-Spine Switch 107 may be a "thin" switch device that is configured to send and receive communications using known Fabric Path or Transport Interconnect with Lots of Links (TRILL) techniques.

The servers 104(1)-104(3) are physical servers that are configured to exchange data communications with each other in the network 100. Each of the servers 104(1)-104(3) may be configured to manage or host a plurality of devices. These devices are referred to as host devices and are shown at reference numerals 108(1)-108(n). Host device 108(1) may be referred to hereinafter as "Host 1," host device 108(2) may be referred to hereinafter as "Host 2" and so on. The host devices 108(1)-108(n) may be, for example, physical or virtual network devices that are configured to communicate with each other within the network 100. For simplicity, host devices 108(1)-108(n) are described hereinafter as virtual devices or virtual machines, but it should be appreciated that the communication techniques described herein may be applicable to physical host devices as well.

The servers 104(1)-104(3) host respective ones of the host devices 108(1)-108(3) on hardware or software components. For example, some of the host devices 108(1)-108(n) may be assigned to different subnets in different VLANs. In one example, as shown in FIG. 1, Host 1 (having an Internet Protocol (IP) address 1.1.1.2) is hosted by Server 1 in Rack Unit 1 and is assigned to subnet 1.1.1.1/24 in VLAN 100. Host 2 (with IP address 2.2.2.2) is hosted by Server 2 in Rack Unit 2 and is assigned to subnet 2.2.2.1/24 in VLAN 200. Host 3 and Host N are hosted by Server 3 in Rack Unit 3 and are also assigned to VLAN 200. Host 3 (with IP address 2.2.2.3) belongs in subnet 2.2.2.1/23 of VLAN 200, and host N (with IP address 2.2.2.N) belongs in subnet 2.2.2.1/24 in VLAN 200. Thus, Host 2, Host 3 and Host N each are assigned to the same VLAN 200, while Host 1 is assigned to a different VLAN 100.

ToR Switch 1, ToR Switch 2 and ToR Switch 3 may be layer 2 network switch devices as defined by the Open Systems Interconnection (OSI) model. As layer 2 switch devices, ToR Switch 1, ToR Switch 2 and ToR Switch 3 are configured to use Media Access Control (MAC)/IP address information associated with network devices (e.g., the servers 104(1)-104(3) and/or the host devices 108(1)-108(n)) communicating with each other. The switches 106(1)-106(n) can utilize the address information associated with the host devices 108(1)-108(n) to route communications between the host devices optimally in the network 100. For example, the switches 106(1)-106(n) are configured with packet forwarding process logic 110 to update corresponding routing tables and to direct communications optimally in the network 100. These techniques are described in detail herein.

It should be appreciated that FIG. 1 may comprise any number of rack units, servers, host devices, ToR switches and Fabric-Spine Switches. For example each rack unit may have any number of servers which are configured to host any number of host devices. For simplicity, the topology shown in FIG. 1 is described in connection with the optimally routing techniques described herein.

Figure 2:
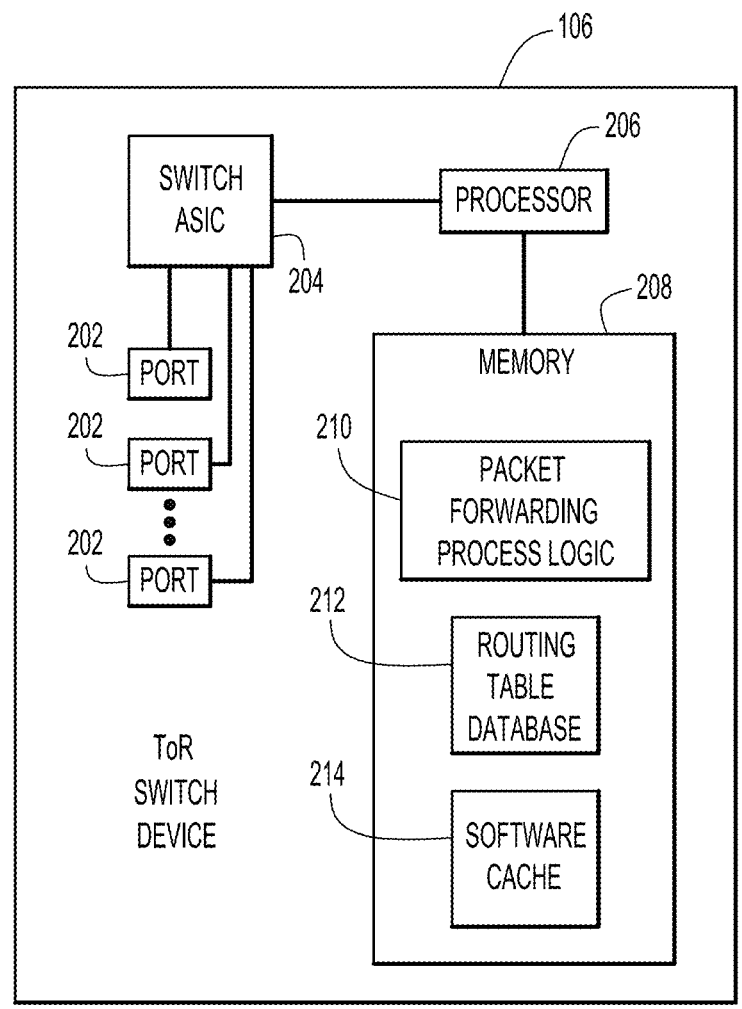
FIG. 2 shows an example block diagram of the switch device configured to update a routing table database of the switch device to optimally route packets in the network.

Reference is now made to FIG. 2. FIG. 2 shows an example block diagram of a ToR switch device. For simplicity, the ToR switch device in FIG. 2 is shown at reference numeral 106, though it should be appreciated that the ToR switch device 106 may be any of the ToR switch devices in the network 100. The ToR switch device 106 comprises, among other components, a plurality of network ports 202, a switch application specific integrated circuit (ASIC) unit 204, a processor 206 and a memory 208. The ports 202 are configured to receive communications (e.g., packets) from devices in the network 100 and to send communications to devices in the network 100. For example, the ports 202 may be configured to send/receive data packets to/from the servers 104(1)-104(3) and to/from the Fabric-Spine Switch 107. The ports are coupled to the switch ASIC 204. The switch ASIC 204 enables packets received by the ToR switch device 106 to be forwarded to the appropriate device in the network 100. For example, when the ToR switch device 106 receives a packet at a first port, the switch ASIC 204 determines a second port on which the packet should be forwarded in the network. That is, if a packet is received at the first port from Server 1, the switch ASIC 204 may determine to forward the packet to the second port, which services the Fabric-Spine Switch 107.

The switch ASIC 204 is coupled to the processor 206. The processor 206 is, for example, a microprocessor or microcontroller that is configured to execute program logic instructions (i.e., software) for carrying out various operations and tasks of the ToR switch device 106, as described herein. For example, the processor 206 is configured to execute packet forwarding process logic 210 to access and update a routing table database 212 with address information associated with subnets of the host devices 108(1)-108(n) in the network 100. The functions of the processor 206 may be implemented by logic encoded in one or more tangible computer readable storage media or devices (e.g., storage devices, compact discs, digital video discs, flash memory drives, etc. and embedded logic such as an ASIC, digital signal processor instructions, software that is executed by a processor, etc.).

The memory 208 may comprise read only memory (ROM), random access memory (RAM), magnetic disk storage media devices, optical storage media devices, flash memory devices, electrical, optical, or other physical/tangible (non-transitory) memory storage devices. The memory 208 stores software instructions for the packet forwarding process logic 210. The memory 208 also stores the routing table database that, as described above, stores address information associated with subnets of the host devices 108(1)-108(n) and a software cache 214. Thus, in general, memory 208 may comprise one or more computer readable storage media (e.g., a memory storage device) encoded with software comprising computer executable instructions and when the software is executed (e.g., by the processor 206), it is operable to perform the operations described herein for the packet forwarding process logic 210.

The packet forwarding process logic 210 may take any of a variety of forms, so as to be encoded in one or more tangible computer readable memory media or storage devices for execution, such as fixed logic or programmable logic (e.g., software/computer instructions executed by a processor). In one example, the packet forwarding process logic 210 may be stored in a memory component of the switch ASIC 204. The processor 206 may be an ASIC that comprises fixed digital logic, or a combination thereof.

For example, the processor 206 may be embodied by digital logic gates in a fixed or programmable digital logic integrated circuit, which digital logic gates are configured to perform the packet forwarding process logic 210. In one example, the processor 206 may also store the software cache 214. In general, the packet forwarding process logic 210 may be embodied in one or more computer readable storage media encoded with software comprising computer executable instructions and when the software is executed operable to perform the operations described hereinafter.

Referring back to FIG. 1, in general, as explained above, the ToR switches 106(1)-106(3) in network 100 can learn address information associated with the host devices 108(1)-108(n). For example, as the host devices 108(1)-108(n) join the network 100, information associated with the host devices is distributed to the ToR switch devices 106(1)-106(3) in accordance with known address learning techniques (e.g., MAC address learning or internal border gateway protocols (iBGP)) or any similar protocol. This information may comprise, among other things, the MAC/IP address associated with the host devices, the subnet assigned to the host devices and the VLANs assigned to the host devices.

Upon receiving this information (referred to hereinafter as "address information"), the ToR switch devices 106(1)-106(3) may update a memory component to include the address information associated with the host devices 108(1)-108(n). For example, the memory component may be corresponding routing table databases 212 of the ToR switches 106(1)-106(3). In other words, as the ToR switches 106(1)-106(3) receive the address information about the host devices 108(1)-108(n), the ToR switches 106(1)-106(3) may store this information in their corresponding routing table databases 212, and thus, the routing table databases 212 will store information mapping the host devices to the respective address information associated with the host devices.

In one example, the ToR switches 106(1)-106(3) initially receive the address information associated with the host devices 108(1)-108(3) and store this information in corresponding temporary software caches. When a ToR switch attempts to store the address information in its routing table database 212, the address information is said to be "leaked" from the software cache to the memory component (e.g., the routing table database 212 or a forwarding information base table). Thus, a ToR switch stores the address information associated with the host devices 108(1)-108(n) by "writing" the address information from the software cache of the ToR switch to the routing table database of the ToR switch.

By storing the address information in the routing table databases 212, the ToR switches 106(1)-106(3) ensure that they have the necessary routing information to forward packets within the network 100. As a result, the ToR switches 106(1)-106(3) may receive packets from any host device, and based on the address information in the routing table database 212, the ToR switches can forward the packets to any other host device in the network 100 (also known as "any-to-any communications" or "any-to-any reachability"). The ToR switch performs this forwarding while still retaining an optimal communication path between the host devices for the packet. For example, if all of the ToR switches in network 100 store address information for all host devices in their corresponding routing table databases 212, the ToR switches would be able to achieve optimal one-hop forwarding of communications (e.g., via the Fabric-Spine Switch 107) to an appropriate destination ToR switch (and ultimately to the destination host device).

However, for large data centers, it may be impractical for ToR switches to store in the routing table databases the address information for every host device in the network 100. Each rack unit in the network 100 may store a large number of servers, and each of the servers may host an even larger number of host devices. For example, rack units may store thousands of servers, and each server may host thousands of host devices, thus resulting in millions of potential entries in the routing table databases of the ToR switches. As a result, in large data center environments, if ToR switches store the address information for each and every host device, processing capabilities of ToR switches may be diminished and communication delays or disruptions may result from the ToR switches searching through large numbers of routing table database entries in order to optimally route data packets in the network 100.

Thus, it is more practical for ToR switches to store in the routing table databases address information of host devices participating only in active data flows or active data communications in the network 100 while still maintaining any-to-any reachability between all host devices within the network 100. As explained above, the upon receiving the address information associated with host devices in the network, the ToR switches initially store the address information in software caches and then, if desired, the ToR switches write the address information to the routing table databases 212. The techniques presented herein involve writing the address information from the software caches to the routing table databases of the ToR switch devices only for host devices involved in active data communications.

As stated above, when the address information is stored in the routing table databases, packets that are sent in the network 100 between host devices are optimally sent through the network 100. For example, in FIG. 1, assuming the address information of Host 1 and Host 3 are stored in the routing table databases of all the ToR switches, a packet sent from Host 1 destined for Host 3 will travel optimally in the network (via a one-hop path between the ToR switches) as follows:
Host 1->ToR Switch 1->Fabric-Spine Switch->ToR Switch 3->Host 3.

In other words, by writing the address information associated with Host 1 and Host 3 to the routing table database 212, the ToR switches can send the packet through the network using the optimal one-hop path, since the address information of Host 1 and Host 3 is stored in the routing table database 212 (e.g., comprising the subnet and VLAN information associated with Host 1 and Host 3).

If, however, the address information of Host 1 and Host 3 is not written to the routing table database 212 of the ToR switches, the ToR switches might not optimally route the packet sent from Host 1 destined for Host 3. Instead, the ToR switches may have partial information associated with Host 1 and Host 3. For example, since the address information is not stored in the routing table database 212 of the ToR switches, the ToR switches may only be aware of the subnet/VLAN in which Host 1 and Host 3 reside. Thus, initial packet communications between Host 1 and Host 3 may travel sub-optimally through the network, as follows:
Host 1->ToR Switch 1->Fabric-Spine Switch->ToR Switch 2->Fabric-Spine Switch->ToR Switch 3->Host 3

In other words, the initial packet communications may travel sub-optimally (e.g., via a two-hop path) using the subnet entry information during a period before which the packet entry may be stored in a software cache. After the packet entry is stored in the software component, subsequent packet communications may travel optimally in the network. That is, at reference A in FIG. 1, the packet is initially sent from Host 1 to ToR Switch 1. Upon receiving the packet, the ToR Switch 1 determines that the packet is destined for a host device in VLAN 200. However, since the address information associated with Host 3 is not stored in the routing table database of ToR Switch 1, ToR Switch 1 forwards the packet to any ToR switch that services host devices in VLAN 200. That is, ToR Switch 1 knows that the packet is destined for a host device in VLAN 200, but since it does not have the address information for Host 3 stored in its routing table database, the ToR Switch 1 forwards the packet to any ToR switch that resides in VLAN 200. In other words, ToR Switch 1 may not be able to forward the packet to the ToR switch that manages Host 3, but ToR Switch 1 will be able to forward the packet to a ToR switch that will be able to ultimately forward the packet to the correct ToR switch in order to maintain any-to-any reachability in the network 100.

Thus, at B in FIG. 1, the packet is sent from ToR Switch 1 to the Fabric-Spine Switch 107, and then at C, the packet is sent from the Fabric-Spine Switch 107 to ToR Switch 2. Upon receiving the packet, ToR Switch 2 evaluates the packet and determines that it does not manage the destination host device (Host 3). Accordingly, ToR Switch 2 forwards the packet to another ToR switch that service host devices in VLAN 200, and thus ToR Switch 2, at D, forwards the packet back to the Fabric-Spine Switch 107 to be forwarded, at E, to ToR Switch 3. Upon receiving the packet, ToR Switch 3 determines that it manages Host 3, and thus, forwards the packet to Host 3.

Figure 3:
FIG. 3 shows an example routing table comprising address information associated with host devices in the network.

Reference is now made to FIG. 3 with continued reference to FIG. 1. FIG. 3 shows at reference numeral 300 an example of address information entries stored in the routing table database 212. In one example, address information of host devices that are directly connected to a ToR switch (e.g., "local" subnets) are written into the routing table database of that ToR switch as soon as these host devices join the network to indicate the adjacency of these host devices. Local subnets may be installed directly in the memory components (e.g., hardware) of the ToR switch.

In another example, every time that a ToR switch receives a packet with a source address or destination address that is not in its routing table database and not directly connected to a ToR switch (e.g., "remote" subnets), the ToR switch device locates the address information in its software cache and writes this information to the routing table database 212. Remote subnets may be installed in the memory components as an ECMP entry that contains the set of ToRs across which the subnet spans. In one example, iBGP or similar protocol will advertise the subnet prefix of remote subnets to ToR switches in the network.

Thus, in the example in FIG. 1, described above, upon receiving the packet from Host 1, ToR switch 1 evaluates the packet and identifies the address information associated with Host 1 in its software cache and stores or writes this address information to its routing table database 212. Additionally, ToR Switch 1 evaluates the packet and identifies the address information associated with Host 3 in its software cache and writes this address information to its routing table database 212. Likewise, upon receiving the packet, ToR Switch 2 and ToR Switch 3 write the address information associated with Host 1 and Host 3 into its routing table database 212. Thus, the ToR switches store in their routing table databases address information associated with host devices involved in active data flows in the network 100.

In the above example, the initial transmission of the packet from Host 1 to Host 3 is sent sub-optimally through the network 100, since ToR Switch 1, ToR Switch 2 and ToR Switch 3 did not have the appropriate address information in their respective routing table databases. However, after this information is written to the routing table databases, subsequent packets between Host 1 and Host 3 will be sent optimally through the network. That is, after the address information of Host 1 and Host 3 are stored in the routing table databases of the ToR switches, packets will travel optimally in the network 100, as follows:
Host 1->ToR Switch 1->Fabric-Spine Switch->ToR Switch 3->Host 3.

Thus, any-to-any reachability is maintained between host devices in the network 100 by allowing the packets to reach the destination host device (Host 3), albeit sub-optimally during the initial packet transmission. Subsequent packet transmissions are then sent optimally (e.g., via a one-hop route) while still maintaining the any-to-any reachability. In other words, any-to-any reachability is always possible in the network, and by utilizing the techniques described herein, the ToR switches are able to carve out optimal paths for active conversations between host devices (if one exists) for optimal reachability between host devices in the network. These techniques avoid unnecessary usage of network bandwidth by avoiding multiple hops in the network for active hosts-to-host flows. It should be appreciated that the techniques herein may be applied to host devices operating under Internet Protocol (IP) version 4 (IPv4) protocols as well as host devices operating under IP version 6 (IPv6) protocols.

Figure 4:
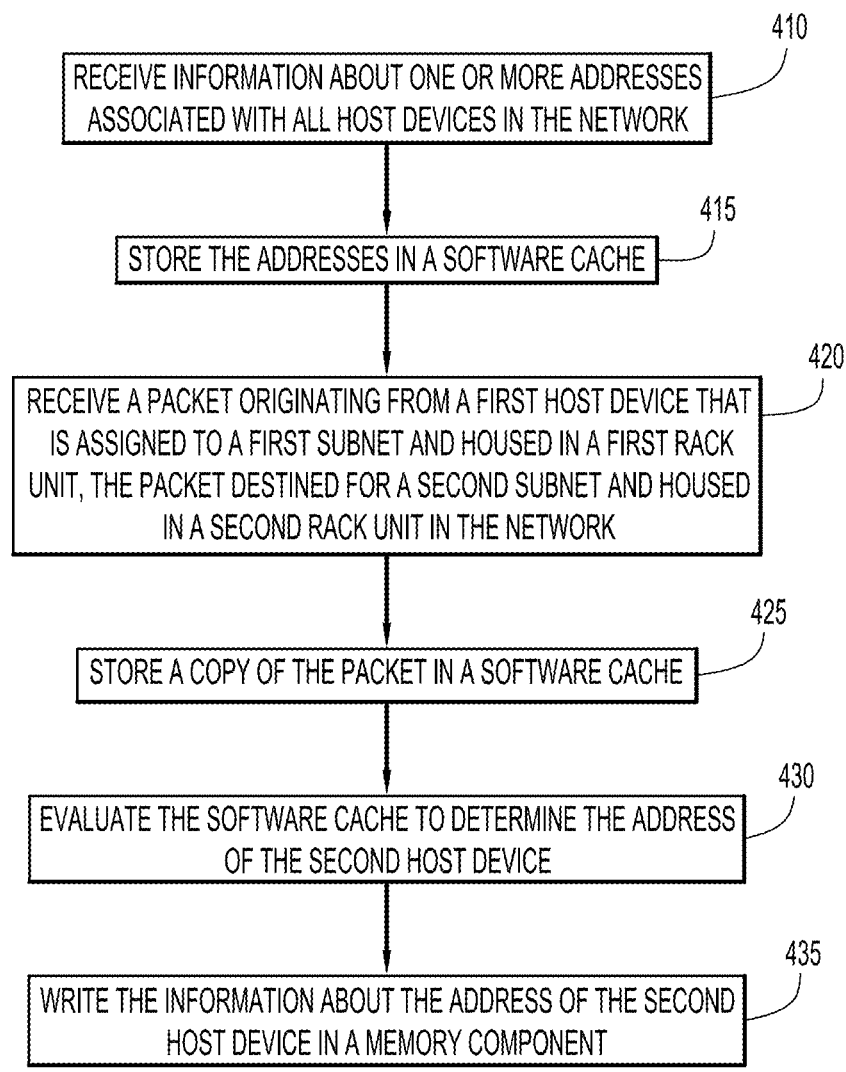
FIG. 4 shows an example flow chart depicting operations performed by the switch device to update the routing table and to route packets optimally in the network.

Reference is now made to FIG. 4. FIG. 4 shows an example flow chart 400 depicting operations for storing address information in a memory component of the ToR switches and routing packets in the network 100. At reference numeral 410, a ToR switch receives information about one or more addresses (e.g., address information) associated with all host devices in the network 100. At operation 415, the ToR switch stores the addresses in a software cache, and, at operation 420, the ToR switch receives a packet originating from a first host device assigned to a first subnet, housed in a first rack unit and destined for a second host device assigned to a second subnet, housed in a second rack unit in the network 100. The ToR switch then stores a copy of the packets in a software cache, at operation 425. The ToR switch, at operation 430, evaluates the software cache to determine the address of the second host device. At operation 435, the ToR switch then writes the address of the second host device in a memory component.

It should be appreciated that the techniques described above in connection with all embodiments may be performed by one or more computer readable storage media that is encoded with software comprising computer executable instructions to perform the methods and steps described herein. For example, the operations performed by one or more of the ToR switches 106(1)-106(3) may be performed by one or more computer or machine readable storage media (non-transitory) or device executed by a processor and comprising software, hardware or a combination of software and hardware to perform the techniques described herein.

In summary, a method is provided comprising: at a first switch device of a first rack unit in a network, receiving information about one or more addresses associated with all host devices in the network; storing the addresses in a cache at the first switch device; receiving a packet originating from a first host device that is assigned to a first subnet and housed in the first rack unit, the packet destined for a second host device that is assigned to a second subnet and housed in a second rack unit in the network; storing a copy of the packet in the cache; evaluating the cache to determine the address of the second host device; and writing the information about the address of the second host device into a memory component of the first switch device.

In addition, one or more computer readable storage media encoded with software is provided comprising computer executable instructions and when the software is executed operable to: receive information about one or more addresses associated with all host devices in a network; store the addresses in a cache; receive a packet originating from a first host device that is assigned to a first subnet and housed in the a first rack unit, the packet destined for a second host device that is assigned to a second subnet and house in a second rack unit in the network; store a copy of the packet in the cache; evaluate the cache to determine the address of the second host device; and write the information about the address of the second host device into a memory component.

Additionally, an apparatus is provided, comprising: a port unit; a switch unit coupled to the port unit; a memory unit; and a processor coupled to the switch unit and the memory unit and configured to: receive information about one or more addresses associated with all host devices in a network; store the addresses in a cache receive a packet originating from a first host device that is assigned to a first subnet and housed in the a first rack unit, the packet destined for a second host device that is assigned to a second subnet and house in a second rack unit in the network; store a copy of the packet in the cache; evaluate the cache to determine the address of the second host device; and write the information about the address of the second host device into a memory component.

The above description is intended by way of example only. Various modifications and structural changes may be made therein without departing from the scope of the concepts described herein and within the scope and range of equivalents of the claims.

What is claimed is:

1. A method comprising:
    at a first switch device of a first rack unit in a network, receiving information about one or more addresses associated with all host devices in the network;
    storing the addresses in a cache at the first switch device;
    storing address resolution information for active commutations in the network in one or more portions of a memory component, the cache being a temporary storage separate from the one or more portions of the memory component storing the address resolution information;

receiving a packet originating from a first host device that is assigned to a first subnet and housed in the first rack unit, the packet destined for a second host device that is assigned to a second subnet and housed in a second rack unit in the network;

determining that the address resolution information does not contain an address associated with the second host device;

identifying, based on the address resolution information, a second switch device in a third rack being associated with the second subnet;

forwarding the packet to the second switch device;

determining that the second host device becomes involved in an active communication;

storing a copy of the packet in the cache;

evaluating the cache to determine the address associated with the second host device;

writing information about the address associated with the second host device into the one or more portions of the memory component of the first switch device to facilitate future address resolution;

receiving a subsequent packet originating from the first host device, the subsequent packet destined for the second host device; and forwarding the subsequent packet to a third switch device in the second rack unit by utilizing the information about the address associated with the second host device written to the one or more portions of the memory component of the first switch device.

2. The method of claim 1, wherein forwarding comprises forwarding the subsequent packet such that the subsequent packet traverses the network via a one-hop route.

3. The method of claim 1, wherein forwarding comprises forwarding the subsequent packet to ensure any-to-any communication in the network via an initial sub-optimal route and a subsequent optimal route.

4. The method of claim 1, further comprising writing to the one or more portions of the memory component of the first switch device information about addresses associated with host devices that are directly connected to the first switch device.

5. The method of claim 4, wherein writing addresses associated with host devices that are directly connected to the first switch device comprises writing entries into the one or more portions of the memory component to indicate the adjacency of the host devices that are directly connected to the first switch device.

6. The method of claim 1, further comprising writing to the one or more portions of the memory component of the first switch device subnet prefix information associated with host devices that are not directly connected to the first switch device.

7. The method of claim 6, wherein identifying the second switch device in the third rack being associated with the second subnet comprises:

retrieving from the subnet prefix information in the one or more portions of the memory component of the first switch device the second subnet for the second host device; and identifying the second switch device that manages host devices in the second subnet.

8. The method of claim 1, wherein writing the information about the address associated with the second host device comprises writing the information about the address associated with the second host device as an entry in a routing table database in the one or more portions of the memory component of the first switch device.

9. A non-transitory computer-readable storage media encoded with software comprising computer executable instructions and when the software is executed by a processor operable to:

receive information about one or more addresses associated with all host devices in a network;

store the addresses in a cache;

store address resolution information for active commutations in the network in one or more portions of a memory component, the cache being a temporary storage separate from one or more portions of the memory component storing address resolution information;

receive a packet originating from a first host device that is assigned to a first subnet and housed in a first rack unit, the packet destined for a second host device that is assigned to a second subnet and housed in a second rack unit in the network;

determine that the address resolution information does not contain an address associated with the second host device;

identify, based on the address resolution information, a first switch device in a third rack being associated with the second subnet;

forward the packet to the first switch device;

determine that the second host device becomes involved in an active communication;

store a copy of the packet in the cache;

evaluate the cache to determine the address associated with the second host device;

write information about the address associated with the second host device into the one or more portions of the memory component to facilitate future address resolution;

receive a subsequent packet originating from the first host device, the subsequent packet destined for the second host device; and forward the subsequent packet to a second switch device in the second rack unit by utilizing the information about the address associated with the second host device written to the one or more portions of the memory component.

10. The non-transitory computer readable storage media of claim 9, wherein the instructions operable to forward comprise instructions operable to forward the subsequent packet such that the subsequent packet traverses the network via a one-hop route.

11. The non-transitory computer readable storage media of claim 9, wherein the instructions operable to forward comprise instructions operable to forward the subsequent packet to ensure any-to-any communication in the network via an initial sub-optimal route and a subsequent optimal route.

12. The non-transitory computer readable storage media of claim 9, further comprising instructions operable to write to the one or more portions of the memory component subnet prefix information associated with host devices.

13. The non-transitory computer readable storage media of claim 12, further comprising instructions operable to:

retrieve from the subnet prefix information in the one or more portions of the memory component the second subnet for the second host device; and identify the first switch device that manages host devices in the second subnet.

14. The non-transitory computer readable storage media of claim 9, wherein the instructions operable to write comprise instructions operable to write the information about the address associated with the second host device as an entry in a routing table database in the one or more portions of the memory component.

15. The non-transitory computer readable storage media of claim 9, further comprising instructions operable to write to the one or more portions of the memory component of the first switch device information about addresses associated with host devices that are directly connected to the first switch device, wherein the instructions operable to write addresses associated with host devices that are directly connected to the first switch device comprise instructions operable to write entries into the one or more portions of the memory component to indicate the adjacency of the host devices that are directly connected to the first switch device.

16. An apparatus comprising:
a plurality of network ports;
a switch unit coupled to the plurality of network ports;
a memory; and
a processor coupled to the switch unit and the memory and configured to: receive information about one or more addresses associated with all host devices in a network;
store the addresses in a cache;
store address resolution information for active commutations in the network in one or more portions of the memory, the cache being a temporary storage separate from one or more portions of the memory storing address resolution information;
receive a packet originating from a first host device that is assigned to a first subnet and housed in a first rack unit, the packet destined for a second host device that is assigned to a second subnet and housed in a second rack unit in the network;
determine that the address resolution information does not contain an address associated with the second host device;
identify, based on the address resolution information, a first switch device in a third rack being associated with the second subnet;
forwarding the packet to the first switch device;
determine that the second host device becomes involved in an active communication;
store a copy of the packet in the cache;
evaluate the cache to determine the address associated with the second host device;
write information about the address associated with the second host device into the one or more portions of the memory to facilitate future address resolution;
receive a subsequent packet originating from the first host device, the subsequent packet destined for the second host device; and
forward the subsequent packet to a second switch device in the second rack unit by utilizing the information about the address associated with the second host device written to the one or more portions of the memory.

17. The apparatus of claim 16, wherein the processor is further configured to forward the subsequent packet such that the subsequent packet traverses the network via a one-hop route.

18. The apparatus of claim 16, wherein the processor is further configured to forward the subsequent packet to ensure any-to-any communication in the network via an initial sub-optimal route and a subsequent optimal route.

19. The apparatus of claim 16, wherein the processor is further configured to write to the one or more portions of the memory subnet prefix information associated with host devices.

20. The apparatus of claim 19, wherein the processor is further configured to:
retrieve from the subnet prefix information in the one or more portions of the memory the second subnet for the second host device; and
identify the first switch device that manages host devices in the second subnet.

21. The apparatus of claim 16, wherein the processor is further configured to write the information about the address associated with the second host device as an entry in a routing table database in the one or more portions of the memory.

22. The apparatus of claim 16, wherein the processor is further configured to write to the one or more portions of the memory component of the first switch device information about addresses associated with host devices that are directly connected to the first switch device.

23. The apparatus of claim 22, wherein the processor is configured to write addresses associated with host devices that are directly connected to the first switch device by writing entries into the one or more portions of the memory component to indicate the adjacency of the host devices that are directly connected to the first switch device.

* * * * *